(12) United States Patent
Li et al.

(10) Patent No.: US 12,256,666 B2
(45) Date of Patent: Mar. 25, 2025

(54) MOWING CYLINDER CUTTER AND LAWN CARE TOOL DRIVEN BY BUILT-IN OUTER ROTOR MOTOR

(71) Applicant: Greenman Machinery Company, Beijing (CN)

(72) Inventors: Min Li, Beijing (CN); Huichang Cao, Beijing (CN); Jinmei Liu, Beijing (CN)

(73) Assignee: Greenman Machinery Company, Beijing (CN)

( * ) Notice: Subject to any disclaimer, the term of this patent is extended or adjusted under 35 U.S.C. 154(b) by 402 days.

(21) Appl. No.: 17/834,962

(22) Filed: Jun. 8, 2022

(65) Prior Publication Data

US 2022/0295700 A1    Sep. 22, 2022

Related U.S. Application Data

(63) Continuation of application No. PCT/CN2021/075452, filed on Feb. 5, 2021.

(30) Foreign Application Priority Data

Dec. 25, 2020  (CN) .................. 202011561964.5

(51) Int. Cl.
    *A01D 34/47*    (2006.01)
    *A01D 34/53*    (2006.01)
    *A01D 34/58*    (2006.01)

(52) U.S. Cl.
    CPC .......... *A01D 34/475* (2013.01); *A01D 34/58* (2013.01); *A01D 34/53* (2013.01)

(58) Field of Classification Search
    CPC ...... A01D 34/475; A01D 34/53; A01D 34/56; A01D 34/58
    See application file for complete search history.

(56) References Cited

U.S. PATENT DOCUMENTS 2,831,308 A * 4/1958 Raba .................. A01D 34/53
                                                    56/17.2
5,305,586 A * 4/1994 Lundahl .............. A01D 34/53
                                                    56/14.4
(Continued)

FOREIGN PATENT DOCUMENTS

CN          2812548 Y     9/2006
CN        101307772 A    11/2008
(Continued)

OTHER PUBLICATIONS

ES 2327742 T3—English translation (Year: 2009).*
JP 2013123392 A—English translation (Year: 2013).*
CN 204150992 U—English translation (Year: 2015).*

*Primary Examiner* — Alicia Torres
*Assistant Examiner* — Julia C Tran
(74) *Attorney, Agent, or Firm* — Bayramoglu Law Offices LLC

(57) ABSTRACT

A mowing cylinder cutter and a lawn care tool driven by a built-in outer rotor motor are provided. The cylinder cutter includes an outer rotor motor, blades and a reel. The blades are fixedly connected to the reel through support plates. At least one end of the reel is provided with the outer rotor motor. The outer rotor motor includes a stator assembly and an outer rotor. The stator assembly is connected to a frame through a connecting member, and the outer rotor is fixedly connected to the reel. The lawn care tool includes a working part, a main shaft, a motor shaft and an outer rotor motor. The motor shaft passes through the main shaft. One end of the main shaft is connected to the motor shaft through a bearing assembly. The outer rotor motor is located in the main shaft.

2 Claims, 6 Drawing Sheets

(56) References Cited

U.S. PATENT DOCUMENTS

| | | | |
|---|---|---|---|
| 2005/0257512 A1 | 11/2005 | Derby et al. | |
| 2009/0025356 A1* | 1/2009 | Mahan | A01D 34/53 56/249 |
| 2017/0152638 A1* | 6/2017 | Fu | E01H 5/098 |
| 2017/0156265 A1 | 6/2017 | Zheng et al. | |
| 2017/0201140 A1* | 7/2017 | Cole | E06B 9/171 |
| 2022/0316487 A1* | 10/2022 | Iwata | H02K 16/04 |

FOREIGN PATENT DOCUMENTS

| | | | | |
|---|---|---|---|---|
| CN | 103782679 | A | 5/2014 | |
| CN | 104079113 | A | 10/2014 | |
| CN | 204150992 | U | 2/2015 | |
| CN | 204518471 | U | 8/2015 | |
| CN | 204653759 | U | 9/2015 | |
| CN | 205666746 | U | 10/2016 | |
| CN | 107484487 | A | 12/2017 | |
| CN | 108115302 | A | 6/2018 | |
| CN | 207723718 | U | 8/2018 | |
| CN | 208190486 | U | 12/2018 | |
| CN | 109362327 | A | 2/2019 | |
| CN | 110063119 | A | 7/2019 | |
| DE | 3921068 | A1 | 1/1991 | |
| EP | 1472925 | A1 | 11/2004 | |
| ES | 2327742 | T3 * | 11/2009 | .......... B41F 13/0045 |
| GB | 659967 | A | 10/1951 | |
| JP | 2011142845 | A | 7/2011 | |
| JP | 2013123392 | A | 6/2013 | |

\* cited by examiner

MOWING CYLINDER CUTTER AND LAWN CARE TOOL DRIVEN BY BUILT-IN OUTER ROTOR MOTOR

CROSS REFERENCE TO THE RELATED APPLICATIONS

This application is the continuation application of International Application No. PCT/CN2021/075452, filed on Feb. 5, 2021, which is based upon and claims priority to Chinese Patent Application No. 202011561964.5, filed on Dec. 25, 2020, the entire contents of which are incorporated herein by reference.

TECHNICAL FIELD

The present invention relates to lawn care devices, and more particularly, to a mowing cylinder cutter and a lawn care tool driven by a built-in outer rotor motor.

BACKGROUND

At present, the lawn care device, for example, the cylinder mower, uses the cylinder cutter as the working part. Through the relative movement of the cylinder cutter and the bottom cutter, the grass clamped between the cylinder cutter and the bottom cutter is cut, thereby realizing the mowing function. The cylinder cutter of the motorized cylinder mower generally adopts chain drive, which is complicated. The cylinder cutter drive of the electric cylinder mower on the market is mostly the same as that of the motorized cylinder mower, and it may alternatively adopt a motor provided on the side of the frame. In addition, as an accessory of the cylinder mower, the cylinder cutter for mowing the lawn can be replaced by a working part for lawn care operations such as root cutting and grass grooming.

SUMMARY

An objective of the present invention is to provide a mowing cylinder cutter and a lawn care tool driven by a built-in outer rotor motor. The present invention is driven by a built-in outer rotor motor, which simplifies the transmission structure, improves work efficiency, and makes the whole structure compact.

To achieve the above objective, the present invention adopts the following technical solutions:

A mowing cylinder cutter driven by a built-in outer rotor motor includes an outer rotor motor, blades and a reel, where the blades are fixedly connected to the reel through a plurality of support plates; at least one end of the reel is provided with the outer rotor motor; the outer rotor motor includes a stator assembly and an outer rotor; the stator assembly is connected to a frame through a connecting member, and the outer rotor is connected to the reel; and the blades are multiple and spiral.

In an embodiment, the connecting member may be a motor shaft; the reel may be shaped as a hollow straight cylinder or a variable-diameter cylinder; one end or two ends of the reel may be provided with a motor compartment; the motor shaft passes through the reel, and two ends of the motor shaft may extend out of the reel; and the two ends of the motor shaft may be provided with flat positions, and the motor shaft may be fixedly connected to the frame through the flat positions.

In an embodiment, one end of the reel may be provided with an outer rotor motor and a motor compartment; the outer rotor motor may be provided in the motor compartment; and the stator assembly may be circumferentially limited to the motor shaft through a key.

In an embodiment, two ends of the reel may be respectively provided with outer rotor motors and motor compartments; two outer rotor motors may be respectively provided in the corresponding motor compartments; the stator assembly includes a first sleeve and a stator coil; the stator coil may be provided on the first sleeve; and the first sleeve may be provided on the motor shaft and may be circumferentially limited through a key.

In an embodiment, the motor compartment may be a part of the reel; the motor compartment may be provided with an opening facing outward; the outer rotor motor may be provided in the motor compartment from the opening; an end cap may be provided on an outer side of the outer rotor motor; the end cap may be integrally formed with the outer rotor, and may be matched with the motor compartment to seal the outer rotor motor in the motor compartment; a center of the end cap may be provided with a bearing; and the motor shaft may be connected to and passes through the bearing.

In an embodiment, one end or two ends of the reel may be provided with an outer rotor motor; the connecting member includes a second sleeve being hollow and cylindrical; the stator assembly includes a stator coil; the stator coil may be provided on the second sleeve of the connecting member; the second sleeve may be sleeved on the reel and has a gap with the reel; an outer end of the second sleeve and an end of the outer rotor form a radial labyrinth seal; an end of the reel adjacent to an outer side of the second sleeve may be provided with a bearing; the bearing may be provided in a bearing seat; and the bearing seat may be fixedly connected to the second sleeve.

In an embodiment, the bearing seat and the connecting member may be integrally formed; and/or, an inner end of the outer rotor extends axially to the reel; and/or, an outer end of the outer rotor extends radially to form a flange; an outer end surface of the flange may be provided with at least one annular notch; an outer end of the connecting member extends to the flange; an end surface of the connecting member facing the flange may be correspondingly provided with at least one annular lug boss; and the lug boss may be inserted into the notch, such that the outer end of the connecting member and the outer end of the outer rotor form the radial labyrinth seal.

A lawn care tool driven by a built-in outer rotor motor includes a working part, a main shaft, a motor shaft and an outer rotor motor, where the main shaft is shaped as a hollow cylinder; the motor shaft passes through the main shaft, and two ends of the motor shaft extend out of the main shaft; one end of the main shaft is connected to the motor shaft through a bearing assembly; the outer rotor motor is located in the main shaft and adjacent to the other end of the main shaft; the outer rotor motor includes a stator assembly, an outer rotor and two end caps; the stator assembly is fixedly connected to the motor shaft, and the outer rotor is fixedly connected to the main shaft; and the end caps are integrally formed with the outer rotor, and are connected to the motor shaft through bearing assemblies, respectively; and the working part is fixed to an outer surface of the main shaft.

In an embodiment, the working part may be fixedly connected to the outer surface of the main shaft; or, the outer surface of the main shaft may be spline-shaped, and the working part may be fixedly connected to the outer surface of the main shaft through a spline.

In an embodiment, the working part may be fixedly connected to the outer surface of the main shaft at an interval through a spacer sleeve, and a fixing sleeve may be provided at two ends of the main shaft.

The present invention has the following advantages.

In the mowing cylinder cutter and the lawn care tool driven by a built-in outer rotor motor provided by the present invention, the outer rotor motor is provided inside the cylinder cutter or the working part, and the cylinder cutter or the working part is driven to rotate through the outer rotor of the motor. The present invention achieves a compact structure and high transmission efficiency. This design avoids additional efficiency loss, and greatly improves the work efficiency. In addition, the direct drive of the outer rotor motor improves the working torque and can cope with a complex working environment.

DETAILED DESCRIPTION OF THE EMBODIMENTS

The present invention is described in further detail below with reference to the drawings and embodiments.

Figure 1:
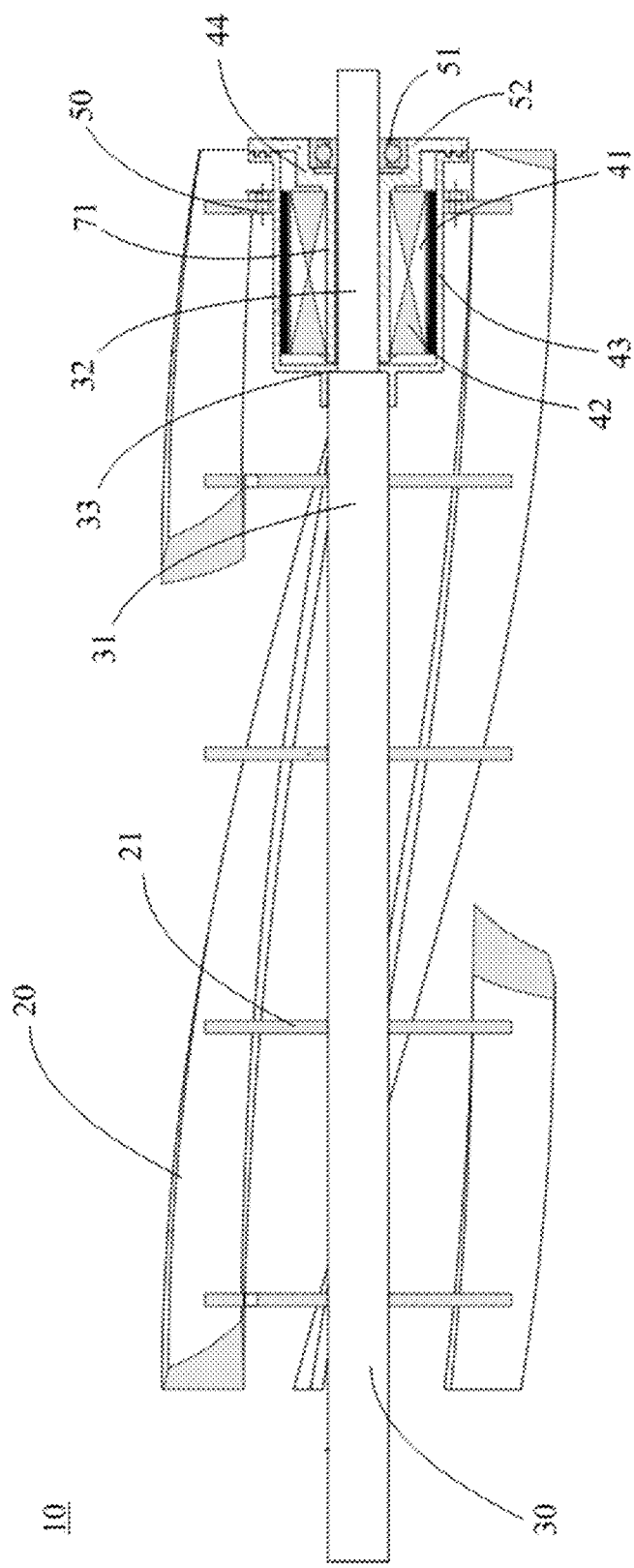
FIG. 1 is a sectional view of a first embodiment of the present invention.

Referring to FIG. 1, FIG. 1 shows a major structure of a mowing cylinder cutter driven by a built-in outer rotor motor according to a first embodiment of the present invention. As shown in FIG. 1, the mowing cylinder cutter 10 driven by a built-in outer rotor motor includes blades 20 and a reel 30. The blades 20 are multiple and spiral, and the blades 20 are fixedly connected to the reel 30 through a plurality of support plates 21 respectively. An outer rotor motor 41 is provided at one end of the reel 30. The outer rotor motor 41 includes a stator assembly 42 and an outer rotor 43. The stator assembly 42 is connected to a frame (not shown) through a connecting member 44, and the frame may be a frame of a lawn mower. The outer rotor 43 is connected to the reel 30.

It should be noted that the connection between the outer rotor 43 and the reel 30 may be a direct connection, that is, the outer rotor 43 is directly connected to the reel 30. It may also be an indirectly connection. For example, the outer rotor 43 is connected to the reel 30 through the support plate 21 or the blade 20 or other component connected to the reel 30. Any connection is acceptable as long as the outer rotor 43 can drive the reel 30 to rotate. The outer rotor motor 41 may be provided at one or both ends of the reel 30. That is, the reel 30 may be provided with an outer rotor motor 41 at only one end, or may be provided with an outer rotor motor 41 at each end.

In this embodiment, the blades 20, the reel 30 and the support plates 21 are fixedly connected by welding. The outer rotor 43 is fixedly connected to the blades 20 and the reel 30 through the support plates 21. Specifically, the outer rotor 43 is fixedly connected to the support plates 21 through fixing bolts 50, and the blades 20 are welded to the support plates 21. Of course, the outer rotor 43 may also be directly fixedly connected to the blades 20 or the reel 30. The connecting member 44 includes a second sleeve 71 having a hollow cylindrical shape. The stator assembly 42 includes a stator coil provided on the second sleeve 71. The second sleeve 71 is sleeved on the reel 30 and has a gap with the reel 30. In other words, the reel 30 passes through the second sleeve 71 and extends, and the reel 30 can rotate freely. A bearing 51 is provided at an end of the reel 30 adjacent to an outer side of the outer rotor motor 41. The bearing 51 is provided in a bearing seat 52. The bearing seat 52 is fixedly connected to the second sleeve 71. Specifically, the bearing seat 52 and the connecting member 44 may be integrally formed. The stator assembly 42 and the connecting member 44 as a whole can be assembled or disassembled from the reel 30 simultaneously.

An inner wall of the outer rotor 43 is circumferentially inlaid with magnetic steel. An inner end of the outer rotor 43 extends axially to the reel 30. Thus, the outer rotor 43 forms an end cap on an inner side to prevent an internal component of the outer rotor motor 41 from being exposed. In this embodiment, the reel 30 includes a large-diameter section 31 and a small-diameter section 32. A step 33 is formed between the large-diameter section 31 and the small-diameter section 32. The inner end of the outer rotor 43 extends axially to the step 33, so as to limit the outer rotor motor 41.

Figure 2:
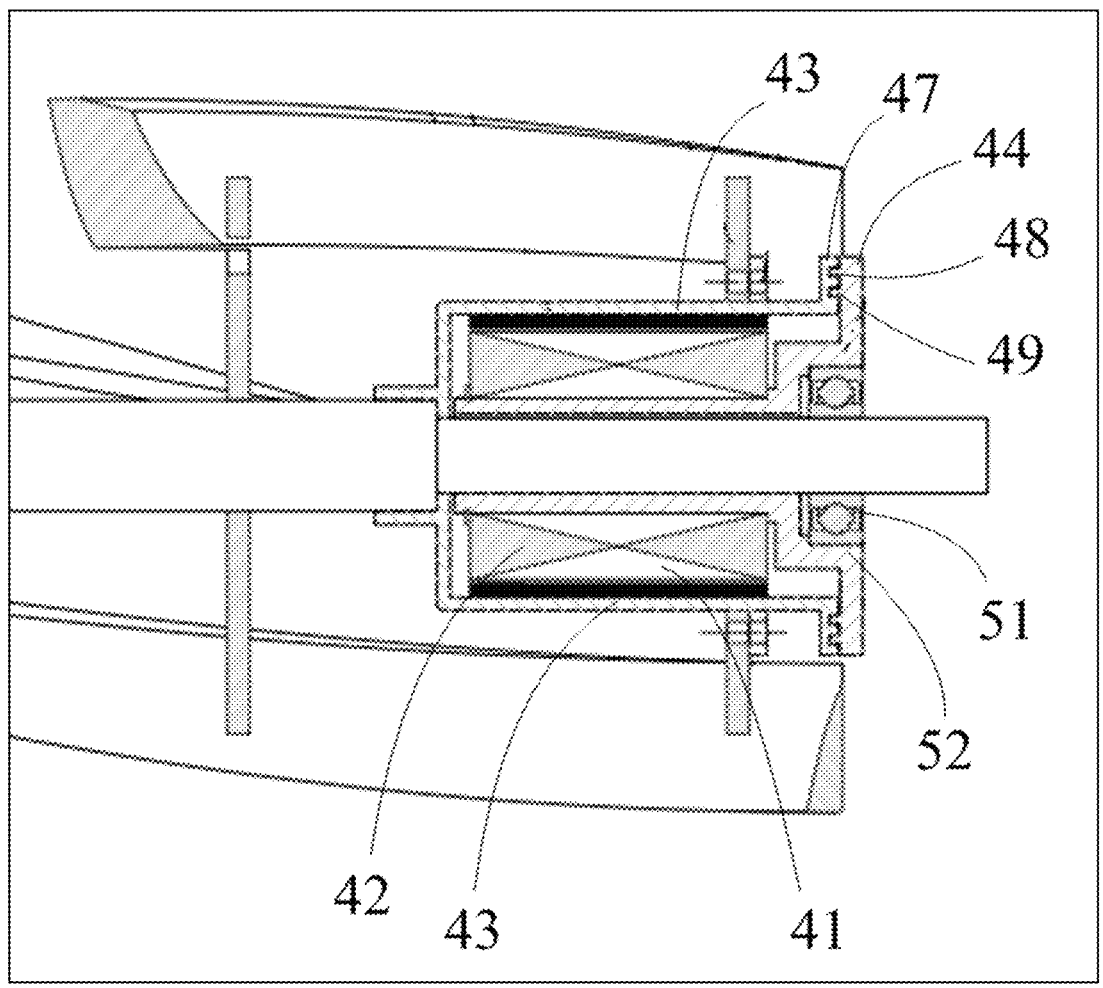
FIG. 2 is a detail view of FIG. 1.

Referring to FIG. 2, a radial labyrinth seal is formed between the outer end of the connecting member 44 and the outer end of the outer rotor 43. Specifically, the outer end of the outer rotor 43 extends radially to form a flange 47. An outer end surface of the flange 47 is provided with two annular notches 48. An outer end of the connecting member 44 extends to the flange 47. An end surface of the connecting member 44 facing the flange 47 is correspondingly provided with two annular lug bosses 49. The two lug bosses 49 are inserted into the two notches 48 to form the radial labyrinth seal between the outer end of the connecting member 44 and the outer end of the outer rotor 43. It should be noted that there may be one or more than one notch 48 and lug boss 49, which is not limited herein. Obviously, the lug boss 49 may also be provided on the flange 47, and correspondingly, the notch 48 may be provided on the connecting member 44, provided that the radial labyrinth seal can be formed between the outer end of the connecting member 44 and the outer end of the outer rotor 43.

In use, two ends of the reel 30 can be supported by a bearing assembly. The reel 30, the support plates 21, the blades 20 and the outer rotor 43 rotate synchronously. The stator assembly 42 is fixed to the frame through the connecting member 44 to keep still, and the outer rotor 43 drives the blades 20 to rotate. In this way, the direct drive of the built-in outer rotor motor avoids the efficiency loss of the related transmission mechanism, greatly improves the working efficiency of the cylinder cutter, greatly reduces the noise of the whole machine, and realizes a compact structure.

Figure 3:
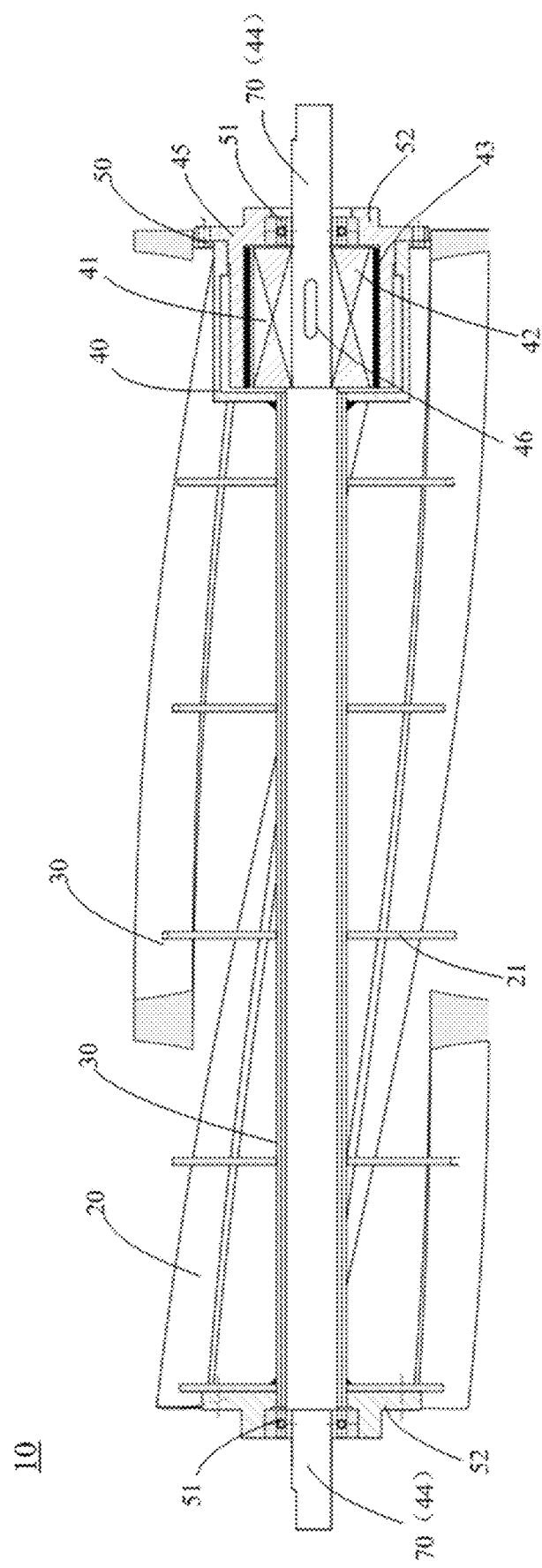
FIG. 3 is a sectional view of a second embodiment of the present invention.

Referring to FIG. 3, FIG. 3 shows a major structure of a mowing cylinder cutter driven by a built-in outer rotor motor according to a second embodiment of the present invention. As shown in FIG. 3, the mowing cylinder cutter 10 driven by a built-in outer rotor motor includes blades 20 and a reel 30. The blades 20 are multiple and spiral. A motor compartment 40 is provided at one end of the reel 30. The blades 20 are fixedly connected to the reel 30 and the motor compartment 40 through a plurality of support plates 21 respectively. An outer rotor motor 41 is provided in the motor compartment 40. The outer rotor motor 41 includes a stator assembly 42 and an outer rotor 43. The stator assembly 42 is connected to a frame through a connecting member 44. The outer rotor 43 is fixedly connected to the support plate 21 on the motor compartment 40 and further fixedly connected to the reel 30.

In this embodiment, the connecting member 44 is a motor shaft 70, and the reel 30 is shaped as a hollow straight cylinder. The reel 30 may also be set as a hollow variable-diameter cylinder if necessary. The motor shaft 70 passes through the reel 30, and two ends of the motor shaft 70 extend out of the reel. The stator assembly 42 is directly circumferentially limited on the motor shaft 70 through a key 46. The two ends of the motor shaft 70 are provided with flat positions, and the motor shaft is fixedly connected to a frame through the flat positions. Bearings 51 are further provided at the two ends of the motor shaft 70, and the bearings 51 are respectively provided in bearing seats 52. A bearing seat 52 at an end adjacent to one end of the outer rotor motor 41 is integrally formed with the outer rotor 43, and a bearing seat 52 at an end far away from the outer rotor motor 41 is fixedly connected to the reel 30. The outer rotor 43 is fixedly connected to the support plate 21 at an end of the motor compartment 40 by a fixing bolt 50.

In order to ensure the assembly accuracy of the outer rotor motor 41, the outer rotor 43 and the bearing seat 52 integrally formed there-with are adapted to the shape of the motor compartment 40, and the bearing seat 52 at the other end is adapted to the shape of the reel 30 to ensure that the overall structure is concentric. In use, the motor shaft 70 is fixed to the frame by the flat positions at both ends, and the stator assembly 42 is fixed to the motor shaft 70 by the key 46 and remains stationary. The outer rotor 43 is fixedly connected to the support plate 21 by a fixing bolt 50, such that the cylinder cutter is driven to rotate by the outer rotor of the motor.

Figure 4:
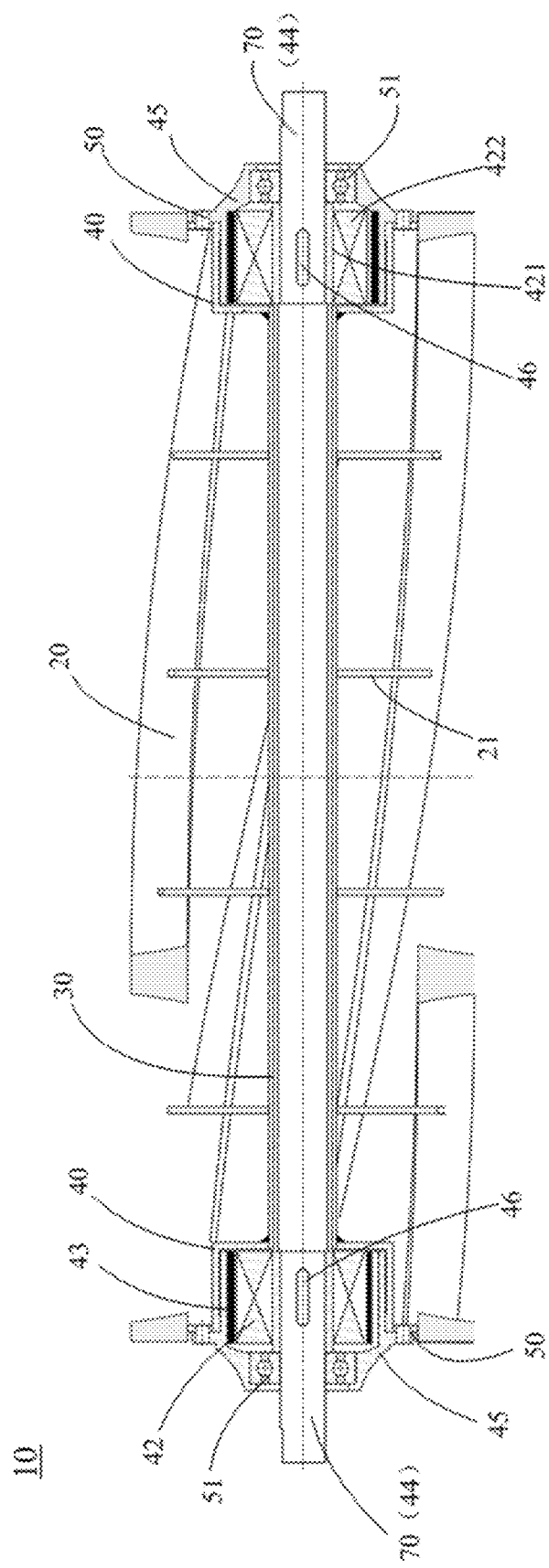
FIG. 4 is a sectional view of a third embodiment of the present invention.

Referring to FIG. 4, FIG. 4 shows a major structure of a mowing cylinder cutter driven by a built-in outer rotor motor according to a third embodiment of the present invention. As shown in FIG. 4, the mowing cylinder cutter 10 driven by a built-in outer rotor motor includes blades 20 and a reel 30. The blades 20 are multiple and spiral. Motor compartments 40 are provided at two ends of the reel 30. The blades 20 are fixedly connected to the reel 30 and the motor compartments 40 through a plurality of support plates 21 respectively. An outer rotor motor 41 is provided in each of the motor compartments 40. The outer rotor motor 41 includes a stator assembly 42 and an outer rotor 43. The stator assembly 42 is connected to a frame through the connecting member 44. The outer rotor 43 is fixedly connected to the support plate 21 on the motor compartment 40 and further fixedly connected to the reel 30.

In this embodiment, the connecting member 44 is a motor shaft 70, and the reel 30 is shaped as a hollow straight cylinder. The reel 30 may also be set as a hollow variable-diameter cylinder if necessary. The motor shaft 70 passes through the reel 30, and two ends of the motor shaft 70 extend out of the reel. The two ends of the motor shaft 70 are provided with flat positions, and the motor shaft 70 is fixed to a frame through the flat positions. The stator assembly 42 includes a first sleeve 421 and a stator coil 422. The stator coil 422 is provided on the first sleeve 421. The first sleeve 421 is provided on the motor shaft 70 and is circumferentially limited through a key 46 to keep still during use. The stator assembly 42 and the motor shaft 70 as a whole can be assembled or disassembled from the reel 30 simultaneously. The outer rotor 43 is fixed to the support plate 21 at an end adjacent to the motor compartment 40 by a fixing bolt 50. In this way, two outer rotor motors are arranged symmetrically on two sides of the cylinder cutter, which minimizes the influence of the built-in motors on the discharging of grass and realizes the power distribution between the two ends. In addition, under the premise of meeting the requirements of use, this design is more compact than the one-sided design of motor.

In this embodiment, the motor compartments 40 and the reel 30 are fixed as a whole. Of course, they may also be independent of each other. The motor compartments 40 each are provided with an opening toward the outside, and the outer rotor motor 41 is provided in the motor compartment 40 from the opening. An end cap 45 is provided outside the outer rotor motor 41. The end cap 45 is integrally formed with the outer rotor 43 of the outer rotor motor 41, and is matched with the motor compartment 40 to seal the outer rotor motor 41 in the motor compartment 40. A center of the end cap 45 is provided with a bearing 51, and the motor shaft 70 is connected to and passes through the bearing 51.

An embodiment of the present invention further provides a lawn care tool driven by a built-in outer rotor motor for lawn care operations such as root cutting and grass grooming. The lawn care tool driven by a built-in outer rotor motor provided by the present invention is described in detail below with reference to the drawing.

Figure 5:
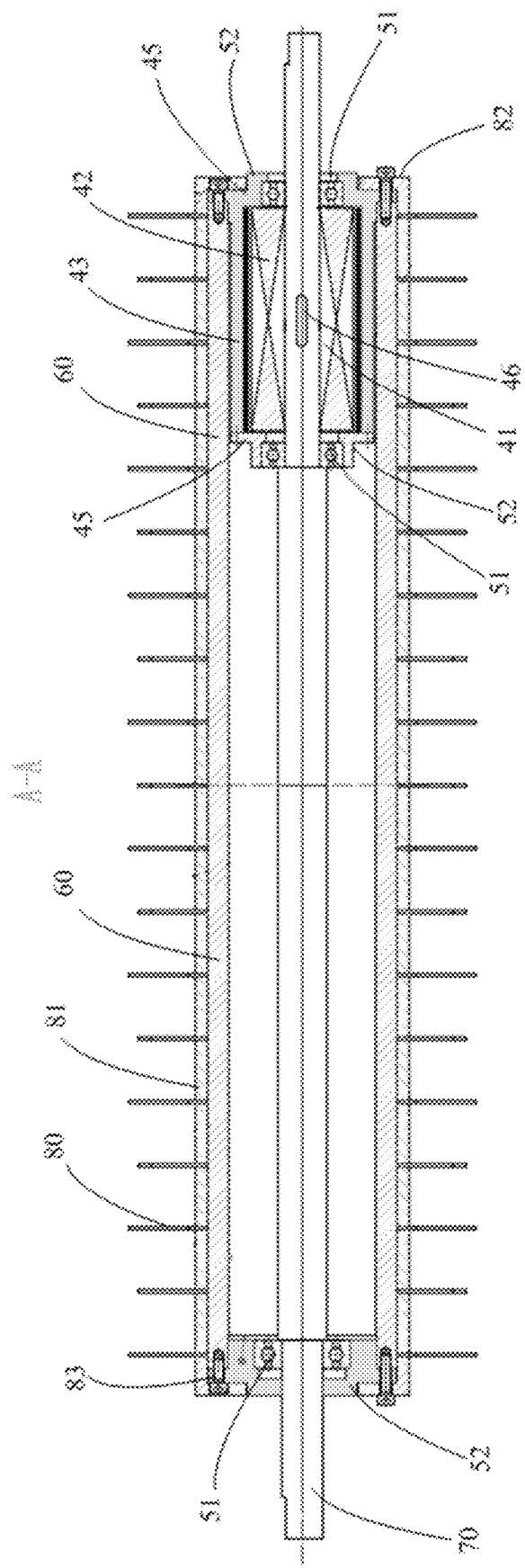
FIG. 5 is a sectional view of a lawn care tool driven by a built-in outer rotor motor according to an embodiment of the present invention.

Referring to FIG. 5, FIG. 5 shows a major structure of the lawn care tool driven by a built-in outer rotor motor. As shown in FIG. 5, the lawn care tool 90 driven by a built-in outer rotor motor provided by this embodiment includes a working part 80, a main shaft 60, a motor shaft 70 and an outer rotor motor 41. The main shaft 60 is shaped as a hollow cylinder. The motor shaft 70 passes through the main shaft 60, and two ends of the motor shaft 70 extend out of the main shaft. One end of the main shaft 60 is connected to the motor shaft 70 through a bearing assembly, and the outer rotor motor 41 is located in the main shaft 60 and adjacent to the other end of the main shaft 60. The outer rotor motor 41 includes a stator assembly 42, an outer rotor 43 and two end caps 45. The stator assembly 42 is fixedly connected to the motor shaft 70, and the outer rotor 43 is fixedly connected to the main shaft 60. The end caps 45 and the outer rotor 43 are integrally formed, and the end caps 45 are connected to the motor shaft 70 through bearing assemblies, respectively. The working part 80 is fixed to an outer surface of the main shaft 60.

Figure 6:
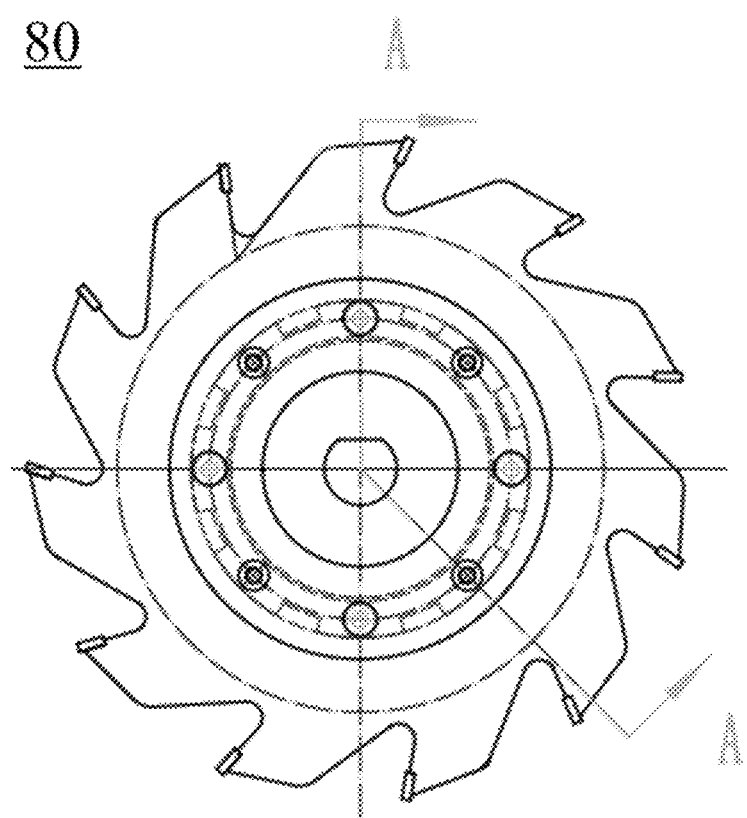
FIGS. 6 and 7 are sectional views of the lawn care tool shown in FIG. 5.
Figure 7:
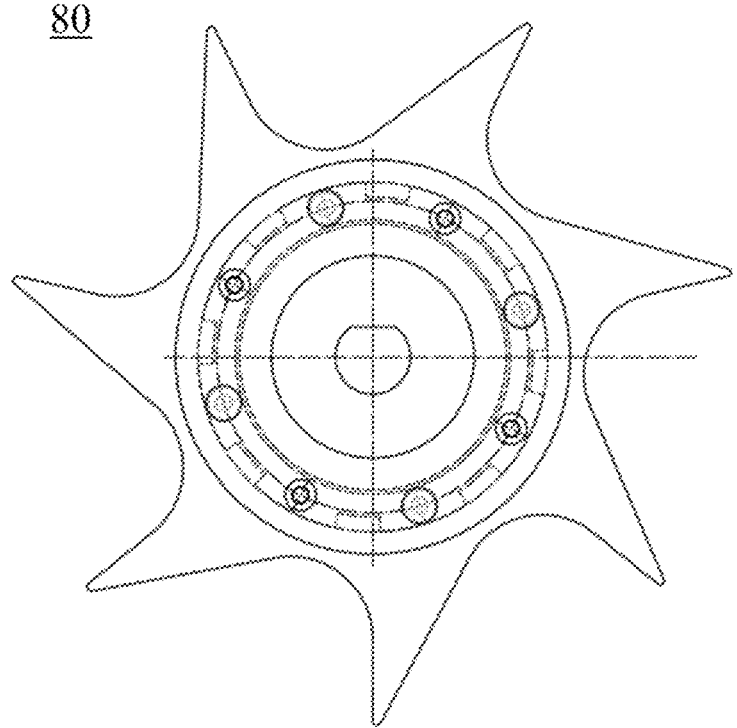

Specifically, the working part 80 may be fixedly connected to the outer surface of the main shaft 60 through a key. Alternatively, the outer surface of the main shaft 60 is spline-shaped, and the working part 80 is fixedly connected to the outer surface of the main shaft 60 through a spline. The fixing method of the working part 80 to the outer surface of the main shaft 60 is not limited, as long as the working part can rotate with the main shaft 60 to perform a corresponding function. The working part 80 may be a root cutting blade or a grass grooming blade, as shown in FIGS. 6 and 7, but the shapes of the root cutting blade and the grass grooming blade are not limited herein. It should be noted that the corresponding working part 80 may be replaced according to actual needs, and the specific function and structure of the working part 80 are not limited. In addition, the working part 80 may be fixedly connected to the outer surface of the main shaft 60 at an interval through a spacer sleeve 81, and a fixing sleeve 82 is provided at two ends of the main shaft 60 for firm locking.

In this embodiment, flat positions are provided at the two ends of the motor shaft 70, and the motor shaft 70 is circumferentially fixed to a frame through the flat positions. An outer end cap 45 of the outer rotor motor 41 is integrally formed with the outer rotor 43, and is fixed to the main shaft 60 by a screw 83, such that the outer rotor 43 can rotate synchronously with the main shaft 60. In a working state, the motor shaft 70 and the stator assembly 42 remain stationary. The outer rotor 43 drives the root cutting blade or grass grooming blade or other lawn care working part on the main shaft 60 to rotate to complete root cutting or grass grooming or other lawn care work.

It should be noted that the bearing assembly in the above embodiment may be a combination of a bearing and a bearing seat, which is a conventional design, and will not be repeated here. The outer rotor motor may be an outer rotor brushless motor, which is not limited herein.

In summary, in the mowing cylinder cutter and a lawn care tool driven by a built-in outer rotor motor provided by the present invention, the outer rotor motor is provided inside the cylinder cutter or the working part, and the cylinder cutter or the working part is driven to rotate through the outer rotor. The present invention achieves a compact structure and high transmission efficiency. This design avoids additional efficiency loss, and greatly improves the work efficiency. In addition, the direct drive of the outer rotor motor improves the working torque and can cope with a complex working environment.

The above are preferred embodiments of the present invention and the technical principles thereof. Those skilled in the art should understand that any equivalent changes, simple replacements and other obvious changes made based on the technical solutions of the present invention without departing from the spirit and scope of the present invention should fall within the protection scope of the present invention.

What is claimed is:

1. A mowing cylinder cutter driven by a built-in outer rotor motor, comprising an outer rotor motor, a plurality of spiral blades and a reel; wherein
    the plurality of spiral blades are fixedly connected to the reel through a plurality of support plates;
    at least one end of the reel is provided with the outer rotor motor;
    the outer rotor motor comprises a stator assembly and an outer rotor; and
    the stator assembly is connected to a frame through a connecting member, and the outer rotor is connected to the reel,
    wherein
        one end or two ends of the reel are provided with the outer rotor motor;
        the connecting member comprises a sleeve being hollow and cylindrical;
        the stator assembly comprises a stator coil;
        the stator coil is provided on the sleeve of the connecting member;
        the sleeve is sleeved on the reel, and the sleeve has a gap with the reel;
        an outer end of the sleeve and an outer end of the outer rotor form a radial labyrinth seal;
        an end of the reel is provided with a bearing, wherein the end of the reel provided with the bearing is adjacent to an outer side of the sleeve;
        the bearing is provided in a bearing seat; and
        the bearing seat is fixedly connected to the sleeve.

2. The mowing cylinder cutter driven by the built-in outer rotor motor according to claim 1, wherein
    the bearing seat and the connecting member are integrally formed; and/or,
    an inner end of the outer rotor extends axially to the reel; and/or,
    the outer end of the outer rotor extends radially to form a flange; an outer end surface of the flange is provided with at least one annular notch; an outer end of the connecting member extends to the flange; an end surface of the connecting member is correspondingly provided with at least one annular lug boss, wherein the end surface of the connecting member faces the flange; and the at least one annular lug boss is inserted into the at least one annular notch, wherein the outer end of the connecting member and the outer end of the outer rotor form the radial labyrinth seal.

\* \* \* \* \*